G. G. GAREY.
RANGE.
APPLICATION FILED JUNE 18, 1913.
1,192,295.
Patented July 25, 1916.
2 SHEETS—SHEET 1.
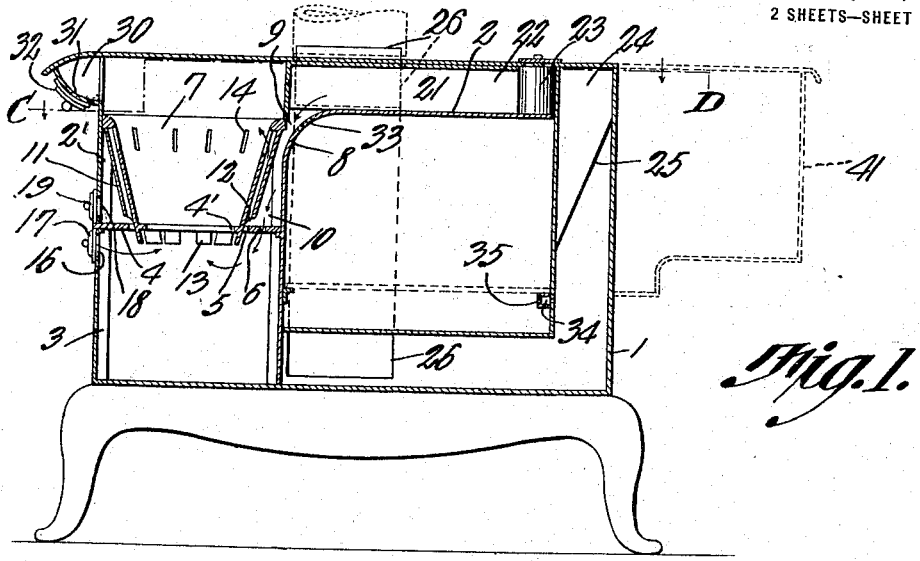
Fig. 1.
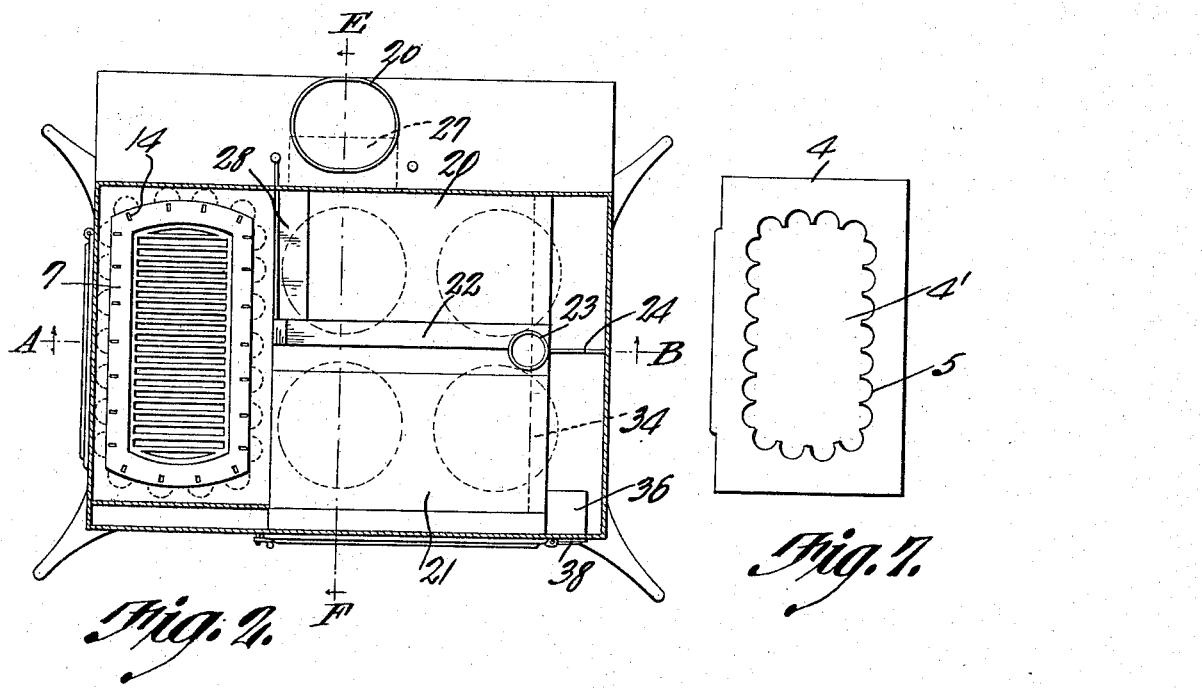
Fig. 2.
Fig. 7.
Witnesses
George G. Garey
Inventor
by C. A. Snow & Co.
Attorneys G. G. GAREY.
RANGE.
APPLICATION FILED JUNE 18, 1913.
1,192,295.
Patented July 25, 1916.
2 SHEETS—SHEET 2.
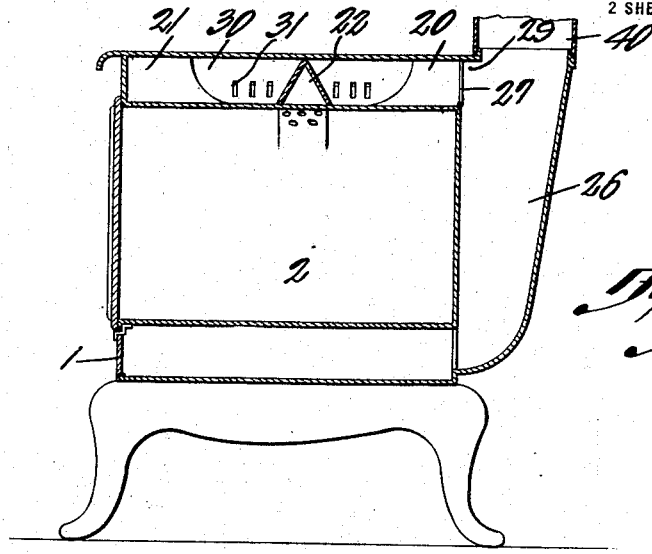
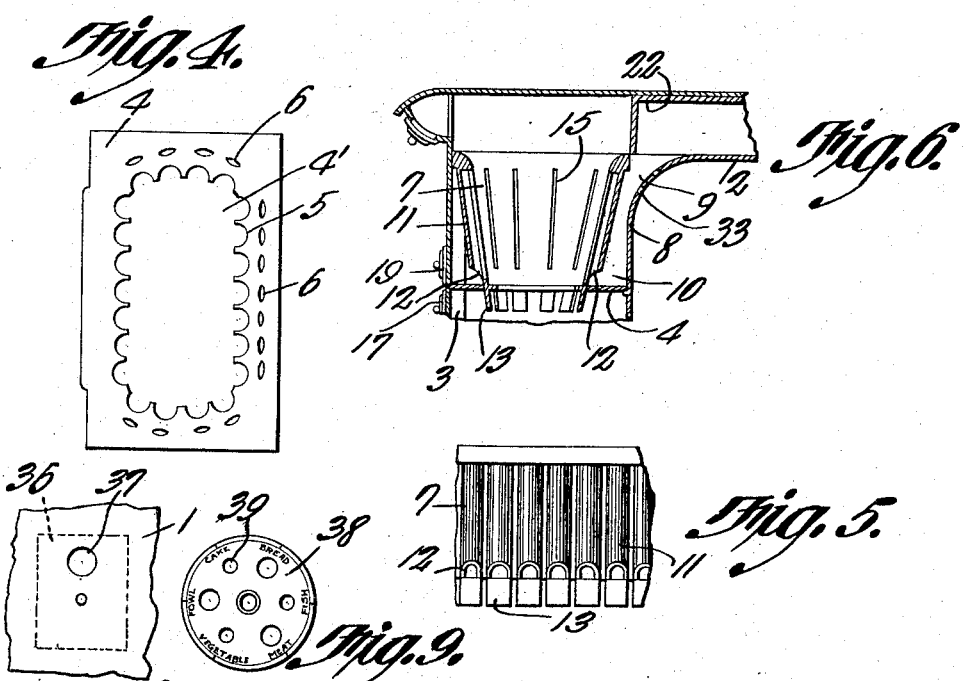
Witnesses
George G. Garey
Inventor
by C. A. Snow & Co.
Attorneys

UNITED STATES PATENT OFFICE.

GEORGE G. GAREY, OF INDIANAPOLIS, INDIANA.

RANGE.

1,192,295.

Specification of Letters Patent.

Patented July 25, 1916.

Application filed June 18, 1913. Serial No. 774,458.

*To all whom it may concern:*

Be it known that I, GEORGE G. GAREY, a citizen of the United States, residing at Indianapolis, in the county of Marion and State of Indiana, have invented a new and useful Range, of which the following is a specification.

This invention relates to cooking stoves or ranges, one of its objects being to provide a structure of this character capable of being adjustable readily so as to use either hard or soft coal as fuel, there being improved means for admitting warm fresh air to the sides of the fire pot so that combustion will be supported close to the wall of the fire pot as well as at points remote therefrom.

Another object is to provide improved means for regulating the flow of hot products of combustion from the fire pot to the outlet flue, the circulation of said combustion products being varied so as to thoroughly heat the contents of the oven or to pass directly from the fire pot to the outlet flue, as when starting a fire.

Another object is to provide means whereby the circulation of hot products of combustion can be so directed as to heat the contents of a reservoir attachment adapted to be placed upon one wall of the range.

A further object is to provide improved means for ventilating the oven of the stove and for supplying fresh air thereto.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing the preferred form of the invention has been shown.

In said drawings:—Figure 1 is a vertical longitudinal section through the stove, said section being taken on the line A—B Fig. 2, a reservoir attachment being indicated by dotted lines. Fig. 2 is a section on line C—D Fig. 1. Fig. 3 is a section on line E—F Fig. 2, the damper being removed from above the oven at the upper outlet into the exit flue. Fig. 4 is a plan view of the grate rest used when hard coal is employed as a fuel. Fig. 5 is an elevation of a portion of the outer side of the fire pot. Fig. 6 is a section, on a reduced scale, through a portion of the range and a modified form of grate rest and fire pot designed primarily for use when soft coal is employed as a fuel. Fig. 7 is a plan view of a grate rest used when soft coal is employed. Fig. 8 is an elevation of a portion of the outer wall of the range and showing a fresh air inlet for supplying the oven. Fig. 9 is a detail view of the damper employed for controlling the supply of fresh air to the oven.

Referring to the figures by characters of reference 1 designates the casing of the stove, the same being provided with an oven 2 spaced from the top, bottom and one end, as shown, while interposed between the oven and the other end of the casing 1 is a fire box 2' and an ash box 3. The fire box and the ash box are separated by a plate 4 constituting a grate rest. This grate rest is detachably mounted in any suitable manner and has a grate receiving opening 4' the edges of which are formed with scallops or recesses 5. Where the grate rest is to be used in connection with a fire pot designed to hold hard coal as a fuel, the said grate rest is provided in its end portions and along that side adjacent the oven 2, with air ports 6. If, however, soft coal is to be used as a fuel, the air ports 6 are eliminated, as shown in Fig. 7.

The fire box 2 is adapted to receive a fire pot 7 so shaped as to fit snugly against the front, back and adjacent side of the casing 1, the top of the fire pot being substantially in the same plane with the top of the oven 2 and fitting close to the oven. A portion of the upper corner of the oven nearest the fire box is rounded, as shown at 8, so that a passage 9 is thus provided between said portion of the oven and the fire pot. The walls of the fire pot converge downwardly so that an air space 10 is thus provided around the fire pot and above the grate rest. Passage 9 opens into this air space.

Hollow ribs 11 are formed upon the outer surface of the fire pot 7 and are closed at their upper ends while their lower ends are open and arched, as shown at 12. Tongues 13 extend downwardly from the fire pot and below the ribs 11, these tongues being adapted to project through the recesses 5 and to hang below the grate rest 4.

As shown particularly in Figs. 1 and 6, the open lower ends of the ribs overhang the grate rest 4 so that air is thus free to flow from the space 10 into the arched ends 12 and thence into the hollow ribs 11. Where the fire pot is to be used in connection with hard coal as a fuel, short slots or apertures 14 are formed in the walls of the fire pot and open into the passages within the ribs 11. If, however, soft coal is to be used as a fuel, it is preferred to provide elongated openings or slots 15, such as shown in Fig. 6, these slots extending downwardly to points close to the grate rest 4.

An air inlet opening 16 is formed in one end of the casing 1 close to and below the grate rest 4 and is adapted to be partly or entirely closed by a damper 17 of any preferred construction. Another air inlet opening 18 is formed in said wall of the casing 1 above the grate rest 4 and has a damper 19 of any suitable form for controlling the passage of air therethrough.

The space formed between the oven 2 and the top of the stove casing 1 is divided into separate passages 20 and 21 by a partition strip 22 which is preferably V-shaped in cross sectional contour, this partition strip extending from one side to the other of the oven. These passages 20 and 21 extend to the wall of the casing and communicate with the down draft of the oven. The ends of the partition strip are closed and one end of said partition strip communicates with the top of the passage 9 while the other end of the partition strip has an inlet 23 extending through the top of the casing 1 and provided with any suitable means whereby the admission of fresh air to the strip 22 can be controlled. Obviously, therefore, strip 22 constitutes a fresh air flue whereby air is conducted from the inlet 23 to the air space 10 by way of passage 9.

A partition strip 24 extends between the oven 2 and one end of the casing 1 and also extends upwardly to the top of the stove casing and abuts against one end of the partition 22. The lower end of this partition strip 24 is cut off obliquely, as shown at 25, the inclined edge thus provided being inclined downwardly toward the end of the oven 2.

An exit flue 26 is arranged back of the casing 1 and communicates at its lower end with one side of the space between the oven 2 and the bottom of the casing 1 and adjacent its upper end with one side of the passage 20. Communication between the exit flue 26 and passage 20 is adapted to be controlled by a suitable damper 27 hinged along its lower edge to the stove casing and adapted to swing upwardly and downwardly to close and open communication respectively. It is to be understood of course that this damper may be of any other preferred construction. Another transverse damper 28 is arranged in passage 20 between that end of the passage nearest the fire box 2 and the port 29 opening into exit flue 26 so that, by closing damper 28, products of combustion will be prevented from entering the passage 20 from the fire box. That end of the casing 1 nearest the fire pot is provided, in horizontal alinement with the passages 20 and 21, with a lateral extension 30 formed with air inlet openings 31 adapted to be closed by any suitable damper such as shown at 32.

The oven 2 has ventilating openings 33 in the rounded portion 8 thereof and extending from front to rear along that end of the oven 2 remote from the openings 33 is a flue 34 constituting a cleat on which a shelf or the like may be mounted. This cleat is provided with small openings 35 for discharging fresh air into the oven close to the bottom thereof and one end of the flue 34 communicates with an inlet box 36 extending from the front of the casing 1 and provided with an inlet opening 37 shown in Fig. 8. This opening has a regulating disk 38 mounted for rotation in front thereof and provided with apertures 39 any one of which is adapted to be brought into position in front of the opening 37. These openings 39 are of different sizes so as to regulate the amount of fresh air admitted to the box 36. On the disk 38 adjacent each opening may be arranged data indicating which of the openings is to be brought into active position while cooking a particular kind of food. For example an opening of one size may be indicated by the word "bread" while an opening of another size can be indicated by the word "cake." One form of regulating disk has been illustrated in detail in Fig. 9. The box 36 is located at the front end of the hollow cleat or flue 34 close to the lower right hand corner of the oven when the stove is constructed as shown in the drawings.

Assuming that hard coal is to be used as a fuel, the same is placed as ordinarily in the fire pot 7 shown in Fig. 1 and the inlet opening 18 is closed while the opening 16 is opened. In starting the fire the dampers 28 and 27 are opened so that products of combustion are free to flow directly from the fire pot to the smoke pipe 40 extending from the exit flue 26. After the fuel has been sufficiently ignited, the heat within the oven can be regulated either by allowing the products of combustion to flow directly from the fire pot to the smoke pipe 40 or by closing the damper 28. With this damper closed and damper 27 opened, products of combustion will pass from the fire pot through the passage 21 and thence downwardly under the short vertical partition 24 after which they will rise at the opposite side of the partition and flow into passage 20 and thence to port 29. By closing damper 27 and opening damper 28, the heat will flow through passages 20 and 21 thence downwardly under the oven after which it passes out through the exit flue 26. By providing the lower inclined edge of partition 24, the products of combustion while flowing under this partition strip prior to their return to the passage 20 and flue 29, will be crowded outwardly against the adjacent end wall of casing 1 so that, by mounting a reservoir 41 upon said end wall of the casing 1, the contents of the reservoir will be quickly heated.

While food is being cooked within the oven, the fumes given off will flow through the openings 33 and fresh air will be admitted to the oven through the flue 34 and openings 35. The fumes leaving the oven by way of the opening 33 will be carried downwardly into the space 10 by fresh air entering the passage 9 through the flue 22. This fresh heated air will flow downwardly from the space 10 through openings 6 and into the ash box where it will mix with the air admitted through port 16 and flow upwardly through the fuel held within the fire pot. A small additional amount of air will rise within the ribs 11 and enter the fuel through the openings 14 so that combustion of the fuel close to the wall of the fire pot will be as complete as that of the fuel contained in the center of the fire pot.

Should it be desired to use soft coal as a fuel, the fire pot illustrated in Fig. 6 is preferably employed although it has been found in practice that the structure shown in Fig. 1 can be used not only in connection with hard coal but also with soft coal. The operation of the structure shown in Fig. 6 is similar to that heretofore described with the exception that the opening 16 is to be closed while the opening 14 is to be opened. Furthermore the openings 6 in the grate rest are dispensed with. Fresh air admitted to the space 10 is thus admitted to the fuel solely by way of ribs 11 and slots 15. In all other respects the operation is similar to that heretofore described.

What is claimed is:—

1. The combination with a casing and an oven supported therein, of a fire box, a fire pot mounted within the fire box and surrounded by an air space, said fire pot having hollow ribs forming flues for maintaining communication between said space and the interior of the fire pot, a hollow partition supported between the oven and the top of the casing, there being passages at opposite sides of the partition for the escape of combustion products, means for closing one of said passages, said hollow partition having a valved air inlet and an outlet, there being a passage extending from said outlet into the space surrounding the fire pot.

2. The combination with a casing, and an oven supported therein, of a partition supported between the oven and the top of the casing, there being passages at opposite sides of the partition for the flow of combustion products, a partition extending into the space between one end of the oven and one end of the casing and dividing said space into continuations of said passages, the lower end of the partition being obliquely disposed for deflecting products of combustion toward the end wall of the casing.

3. In a range, the combination with a casing, an oven therein, and spaced from the walls thereof, of a hollow partition upon the middle portion of the oven and forming separate passages extending throughout the length of the oven and constantly in communication with the space between the end of the oven and the end of the casing, said partition being closed at its ends and having a fresh air inlet at one end extending through the top of the casing, and an outlet adjacent its other end, a fire pot, and means for directing air from said outlet to the interior of the fire pot.

In testimony that I claim the foregoing as my own, I have hereto affixed my signature in the presence of two witnesses.

GEORGE G. GAREY.

Witnesses:
B. D. HEMMETER,
ROY APPLEGATE.

Copies of this patent may be obtained for five cents each, by addressing the "Commissioner of Patents, Washington, D. C."